United States Patent [19]

McAdams

[11] Patent Number: 4,768,862
[45] Date of Patent: Sep. 6, 1988

[54] LIQUID CRYSTAL POLARIZATION REORIENTATION CELL HAVING MAGNETIC FIELD-APPLYING COILS

[75] Inventor: Richard L. McAdams, New Haven, Conn.

[73] Assignee: ITT Corporation, Defense Communications Division, Nutley, N.J.

[21] Appl. No.: 896,478

[22] Filed: Aug. 13, 1986

[51] Int. Cl.⁴ ............................................. G02F 1/13
[52] U.S. Cl. .................................. 350/330; 350/331 R
[58] Field of Search ............................ 350/330, 331 R

[56] References Cited

U.S. PATENT DOCUMENTS

| | | | |
|---|---|---|---|
| 4,066,334 | 1/1978 | Fray et al. | 350/331 R |
| 4,214,819 | 7/1980 | Pohl et al. | 350/330 X |
| 4,711,529 | 12/1987 | Baker | 350/331 R |
| 4,720,171 | 1/1988 | Baker | 350/331 R |
| 4,720,172 | 1/1988 | Baker | 350/334 |
| 4,720,174 | 1/1988 | Baker | 350/347 V |
| 4,737,019 | 4/1988 | Baker | 350/347 V |

OTHER PUBLICATIONS

Chen et al., "Observation of Macroscopic Collective Behavior and New Texture in Magnetically Doped Liquid Crystals," vol. 51, No. 25 of *Physical Rev. Lett.* (Dec. 1983) pp. 2298-2301.

Primary Examiner—Stanley D. Miller
Assistant Examiner—Richard F. Gallivan
Attorney, Agent, or Firm—Robert A. Walsh; Thomas N. Twomey; Mary C. Werner

[57] ABSTRACT

A liquid crystal polarization reorientation cell includes Helmholtz coils disposed on either side of the cell to provide a magnetic field that is substantially perpendicular to the transparent members. The energizing of the magnetic field is utilized to selectively reorient the polarization of at least one frequency of an incident light beam.

8 Claims, 1 Drawing Sheet

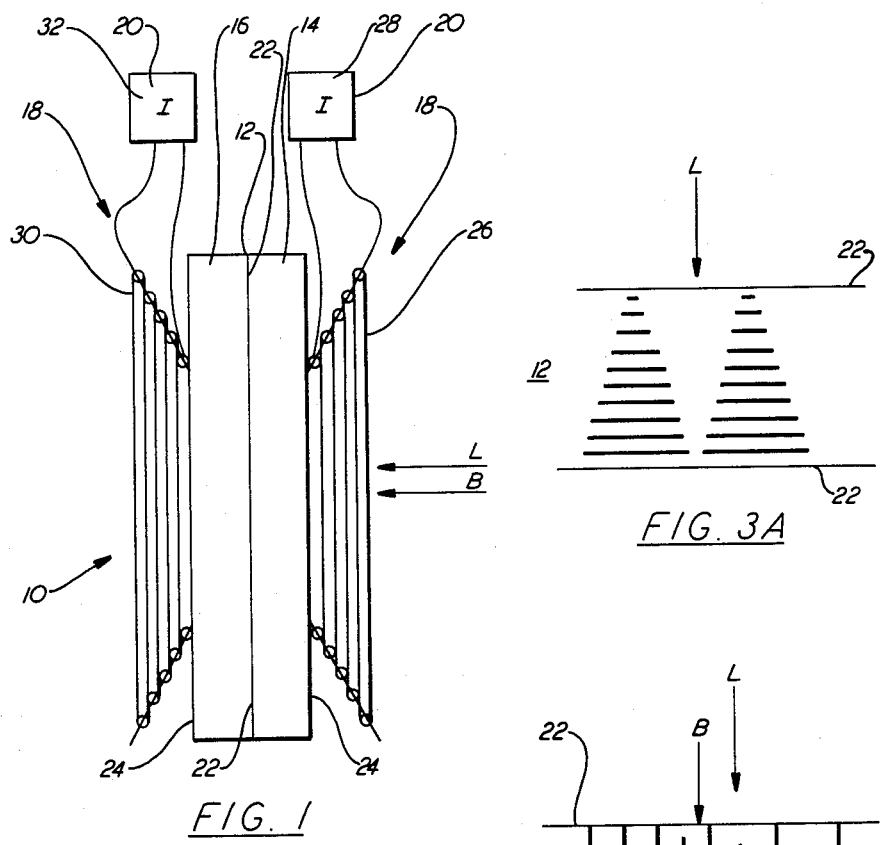
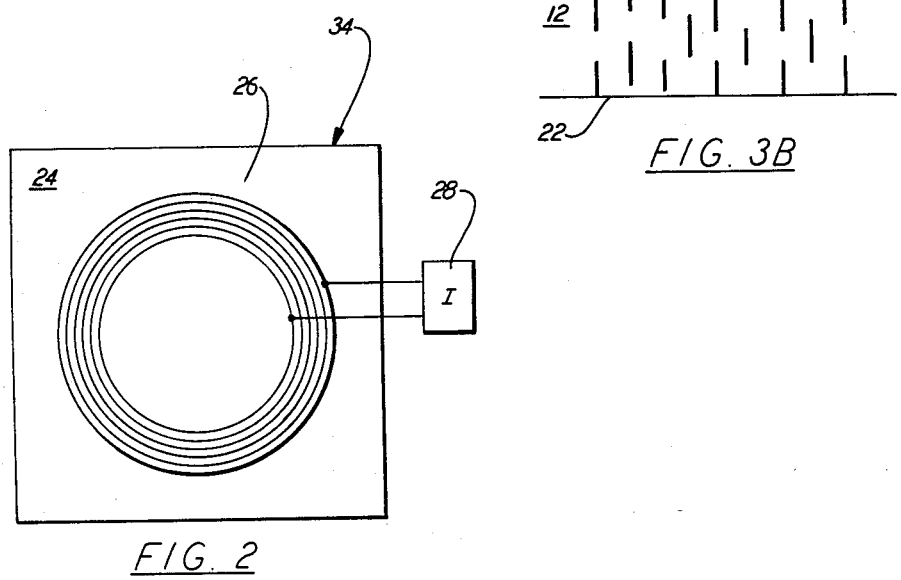

LIQUID CRYSTAL POLARIZATION REORIENTATION CELL HAVING MAGNETIC FIELD-APPLYING COILS

BACKGROUND OF THE INVENTION

The present invention generally relates to a liquid crystal polarization reorientation cell and, in particular, relates to one such cell having means for establishing a magnetic field in the liquid crystal material.

The use of optical fibers as a telecommunication media has numerous advantages compared to currently used telecommunication media. For example, optical fibers can carry a broader bandwidth signal, and hence can convey larger quantities of information over the same period of time than existing media.

Further, light waves are shorter than conventional microwaves commonly used in existing telecommunication systems, and thus, a substantial reduction in the physical size of components is achievable. Such a reduction in size further results in a cost reduction for materials, packaging, and manufacturing. Still further, optical fibers exhibit little or no electromagnetic or radio-frequency interference, thus resulting in a negligible impact on the surrounding environment. In addition, optical fibers are relatively insensitive to electromagnetic or radio-frequency interference from surrounding devices and systems.

To be viable, every telecommunication system must include some means for controllably redirecting a signal, or at least a portion thereof, to, or from, a transmission media or between one, or more, such mediums. In the case of an optical telecommunication system, the preferred means is an optical switch. Currently optical switches are generally mechanical in nature.

However, mechanical switches generally require relatively high driving power and are subject to wear, abrasion and fatigue. As a result, mechanical switches are also prone to failure after repeated use. In addition, since a rather small optical fiber is usually displaced from alignment with one port fiber into alignment with another port fiber, mechanical switches can readily become expensive due primarily to the very small tolerances required to ensure the proper alignment between the various fibers thereof.

Liquid crystal optical switching devices have been proposed as one alternative to mechanical switches. Typical of early designs of such liquid crystal optical switches are those described and discussed in U.S. Pat. No. 4,201,422 issued to McMahon et al. on May 6, 1980, U.S. Pat. No. 4,278,327 issued to McMahon et al. on July 14, 1981 and U.S. Pat. No. 4,385,799 issued to Soref on May 31, 1983. Therein, plurality of liquid crystal switches are described wherein optical fibers are attached to the side angled surfaces of a pair of opposing trapezoidal prisms. The trapezoidal prisms are arranged with the major bases thereof parallel and liquid crystal material is disposed therebetween.

Although the optical switches described in these patents have some advantages over mechanical switches, particularly no moving parts, such liquid crystal switches are both difficult and expensive to manufacture since all of the surfaces of the trapezoidal prisms must not only be optically flat, but also be fixed at a precise angular relation to each other. Consequently, the liquid crystal optical switch designs described in these patents are presently impractical for optical communication systems, that frequently require hundreds, if not thousands, of optical switches.

More recently, less expensive more easily manufactured liquid crystal switches have been developed. For example, those described and discussed in U.S. Ser. Nos. 795,138; 795,148, 4,749,258, 795,149, 4,711,529, abandoned 795,150, 795,151, 4,737,019, 795,152, 4,720,174, 795,154; 795,155, 4,720,171, 795,156, 4,720,172, 795,157, 795,296 all filed Nov. 5, 1985 and assigned to the assignee hereof. The designs described therein overcome many of the difficulties present in the earlier designs, and thus, serve as a basis for the relatively inexpensive manufacture of liquid crystal optical switches.

However, to date substantially all of the liquid crystal switch designs have included one, or more, electrodes to establish an electromagnetic field in, or across, the liquid crystal material to effect the switching or beam splitting functions thereof.

The electrodes, in general, are manufactured thin enough that they are transparent to the light incident upon the switching device. Typically, such electrodes include a thin transparent layer of Indium Tin Oxide. However, the index of refraction of such a conductive material is on the order of about 1.9 whereas the index of refraction of typical nematic liquid crystal materials is on the order of about 1.6. Such a mismatch can result in severe reflections at the interface therebetween, thereby reducing the efficiency of the light transferred due to spurious reflections and other deleterious effects.

Such a mismatch between adjacent materials can be substantially overcome by implementing techniques described in the above referenced U.S. patent application Ser. No. 795,150 filed on Nov. 5, 1985 and entitled LIQUID CRYSTAL CELL FOR USE IN AN OPTICAL SWITCH.

As described therein, intermediate layers having a gradient index of refraction can be formed between the electrode and the liquid crystal material and, in addition, between the transparent member, i.e. glass that also usually has index of refraction of about 1.6, and the ITO electrodes. Although this technique can be implemented inexpensively, and low lost devices can be fabricated, this technique can be a time consuming process during the manufacture of such devices. Further, care must be taken to avoid impurities in the compensatory layers.

Consequently, a liquid crystal device that can avoid the need to compensate for such general reflection, as well as for localized impurities, but effect the desired switch is desirable to more readily derive the benefits of optical fiber signalling systems.

SUMMARY OF THE INVENTION

Accordingly, it is one object of the present invention to provide a liquid crystal polarization reorientation cell that avoids the use of electrodes and other mismatch generating or reflection generating layers.

This object is achieved, at least in part, by a liquid crystal polarization reorientation cell including means for establishing a magnetic field in the liquid crystal material.

Other objects and advantages of the present invention will become apparent to those skilled in the art from the following detailed description read in conjunction with the appended claims and the drawings attached hereto.

BRIEF DESCRIPTION OF THE DRAWING

The drawing, not drawn to scale, includes:

FIG. 1—a cross-sectional view of a liquid crystal polarization reorientation cell embodying the principles of the present invention;

FIG. 2—a top view of another liquid crystal polarization reorientation cell also embodying the principles of the present invention; and FIG. 3A and 3B—schematic views of liquid crystal molecular alignments in different operating states of the cells depicted in FIGS. 1 and 2.

DETAILED DESCRIPTION OF THE INVENTION

A liquid crystal polarization reorientation cell, generally indicated at 10 in FIG. 1 and embodying the principles of the present invention, includes a layer 12 of liquid crystal material disposed between first and second transparent members, 14 and 16, respectively, and means 18 for establishing a magnetic field in the layer 12 of liquid crystal material. Preferably, the liquid crystal polarization reorientation cell 10 further includes means 20 for controlling the magnetic field.

In one preferred embodiment, the layer 12 of liquid crystal material is a nematic liquid crystal, although other types of liquid crystal material may also be employed. In this embodiment, each of the first and second transparent members, 14 and 16, respectively, includes an inner surface 22 and an outer surface 24. In such an embodiment the liquid crystal material is preferably disposed between the inner surfaces 22 of the transparent members, 14 and 16.

In one particular embodiment, the means 20 for establishing a magnetic field includes a first coil 26 of electrically conductive material having a first means 28 associated therewith for controllably regulating an electric current therethrough. Preferably, the coil 26 has an axis that is substantially perpendicular to the inner surface 22 of the member 14. As well known a coil of wire having an electric current sustained therein produces a magnetic field that is axially oriented with respect to the coil. Thus, in this embodiment, the magnetic field created is substantially perpendicular to the inner surfaces 22 of the first and second transparent members 14 and 16, respectively.

Further, in the preferred embodiment, the cell 10, also includes a second coil 30 of conductive material, having a second means 32 associated therewith for regulating the current therethrough. In this embodiment, the first and second coils, 26 and 30, respectively, are disposed on the outer surface 24 of the first and second transparent members, 14 and 16, respectively, and substantially axially aligned with each other.

Further, the first and second coils, 26 and 30, respectively, are formed such that the radii thereof are equal to the perpendicular distance therebetween. Hence, in order to maintain this relationship the coils, 26 and 30, are preferably formed such that the external perimeter thereof increases with the distance separating the corresponding coils, 26 and 30, across the cell 10.

Such a coil arrangement is generally known in the art as a Helmholtz coil and produces a substantially uniform axial magnetic field B in accordance with the following equation:

$$B = \frac{8}{5\,3/2} \frac{\gamma NI}{R}$$

wherein:

B is the magnetic field strength;

$\gamma$ is the permeability of the core of the coil, in this instance air;

N is the number of turns associated with each coil;

I is the current flowing through the coils; and

R is the radius of the coils.

In one particular polarization reorientation cell 10 the layer 12 of liquid crystal material has a thickness on the order of about 10 micrometers and the first and second transparent members 14 and 16, respectively, are glass, having a thickness on the order of about 1 millimeter. In such a cell 10, the anticipated magnetic field strength 'B' required to effect the polarization reorientation is on the order of about 1.5 tesla for a coil having an average radius of about 1 millimeter and an Ni (amp-turns) factor of about 1500 amp-turns. Although this number of amp-turns may appear impractically high, the current may, in fact, be pulsed to reduce the average current needed since liquid crystals relax rather slowly. Thus, the frequency of the current need only be greater than the relative relaxation time of the liquid crystal molecules. The specific ratios and choices for the current, the number of turns, and the duty cycle can be adjusted to suit the particular cell being designed.

With reference to FIG. 2, another liquid crystal polarization reorientation cell 34 is shown wherein the coils 26 and 30, associated with the transparent members, 14 and 16, are embedded therein. In such an instance the coils, 26 and 30, can be made considerably smaller since the two associated Helmholtz coils are closer together. As a result, the design choices of current, turns and duty cycles may be different from those selected for the cell 10 shown in FIG. 1.

In actuality, since many plastic materials are available, the second cell 34 may be more practical if manufactured with the use of a molded plastic. For example, the coils 26 and 30, may be preformed and subsequently embedded within the plastic material during the plastic molding process. Alternatively, in such an embodiment, only a single coil, 26 or 30, may be used to provide the desired magnetic field.

In operation, as shown in FIGS. 3A and 3B, a plane polarized incident light beam 'L' impinges on the polarization reorientation cell, 10 or 34, coaxial with the axis of the coils, 26 and 30. The molecular alignment of the layer 12 of liquid crystal material, in a deenergized state, i.e. where little or no current is flowing in the coils, is oriented in a twisted nematic fashion such as shown in FIG. 3A. Therein the inner surfaces 22 of the transparent members, 14 and 16, are preferably scratched, or otherwise grooved to induce the molecules of the liquid crystal material to be rotated 90° with respect to the inner surface 22 of the opposing transparent members, 14 and 16. Under such conditions, the polarized light beam 'L' incident normal to the cell, 10 or 34, has the polarization thereof rotated 90° as it traverses the cell, 10 or 34. That is, a $T_E$ polarized light beam exits the cell, 10 or 34, as a $T_M$ polarized light beam and vice versa.

In an energized state i.e. when the magnetic field 'B' is impressed on the liquid crystal polarization reorientation cell, 10 or 34, the molecules align themselves homeotropically, i.e. substantially parallel to each other and perpendicular to the inner surfaces 22 of the transparent members, 14 and 16. Consequently, light traversing the cell 10 or 34, has the polarization thereof unchanged.

Although the above discussion has been with respect to a commonly known twisted nematic liquid crystal configuration, a similar operation is available when a Pi cell is used. The basic operation of a Pi cell, is discussed hereinafter. As well known if a liquid crystal material is provided with a particular thickness that is a multiple of Pi times the frequency of a light beam component, that light beam component is retarded with respect to the remaining frequency components of the incident light beam, when the liquid crystal molecules lie parallel to the plane of the incident light beam. That is, by orienting the liquid crystal material in a homogenous fashion, a light beam of a particular frequency can be retarded over the thickness of the cell, 10 or 34, such that the apparent result is a polarization change.

One particular design of a Pi cell is more fully described and discussed in U.S. patent application Ser. No. 795,154 filed on Nov. 5, 1985. This application is assigned to the assignee hereof and incorporated herein by reference.

In the instance of the Pi cell, the original deenergized alignment of the molecules is preferably at 45° with respect to the electric field vector of the incident polarized light beam of the frequency whereat polarization reorientation is to occur.

Although the present invention has been described with respect to particular embodiments other arrangements and configurations may also be developed that, nevertheless, do not depart from the spirit and scope of the present invention. Hence, the present invention is deemed limited only by the appended claims and the reasonable interpretation thereof.

What is claimed is:

1. A liquid crystal polarization reorientation cell comprising:
   first and second transparent members, each of said members having an outer surface;
   a layer of liquid crystal material disposed between said first and second members;
   a first electrically conductive coil disposed on said outer surface of said first transparent member for providing a magnetic field in said liquid crystal material layer, said coil having turns, the external perimeter of said turns increasing with the distance from said outer surface; and
   means connected to said electrically conductive coil for controlling the magnetic field.

2. Cell as claimed in claim 1 wherein said magnetic field providing means further includes:
   a second electrically conductive coil, said second coil being disposed on an outer surface of said second transparent member and coaxial with said first electrically conductive coil.

3. Cell as claimed in claim 2 wherein said first and said second coils are disposed substantially coaxial with the path of an incident light beam.

4. Cell as claimed in claim 1 wherein said magnetic field controlling means is a controllable current source.

5. Cell as claimed in claim 4 wherein said current source is a pulsed current source.

6. A liquid crystal polarization reorientation cell comprising:
   first and second transparent members;
   a layer of liquid crystal material disposed between said first and second members;
   a first electrically conductive coil disposed in said first transparent member for providing a magnetic field in said liquid crystal material layer, said coil being a Helmholtz coil; and
   means connected to said electrically conductive coil for controlling the magnetic field.

7. Cell as claimed in claim 6 which further comprises:
   a second electrically conductive coil, said second coil being disposed within said second transparent member and coaxial with said first coil.

8. Cell as claimed in claim 7 wherein said first and second electrically conductive coils are disposed substantially coaxial with the path of an incident light beam.

* * * * *